US007283657B1

(12) United States Patent
Carlson

(10) Patent No.: US 7,283,657 B1

(45) Date of Patent: Oct. 16, 2007

(54) METHOD AND SYSTEM FOR AUTOMATICALLY ORIENTING A SPHERICAL OBJECT

(76) Inventor: Ralph L. Carlson, 17 Bayview Cir., Osterville, MA (US) 02655

(*) Notice: Subject to any disclaimer, the term of this patent is extended or adjusted under 35 U.S.C. 154(b) by 742 days.

(21) Appl. No.: 10/634,631

(22) Filed: Aug. 5, 2003

Related U.S. Application Data

(60) Provisional application No. 60/401,603, filed on Aug. 7, 2002, provisional application No. 60/402,157, filed on Aug. 9, 2002.

(51) Int. Cl.
*G06K 9/00* (2006.01)
*G06K 9/64* (2006.01)
*G06K 9/68* (2006.01)

(52) U.S. Cl. ....................... 382/141; 382/100; 382/217

(58) Field of Classification Search ................ 382/100, 382/141, 152
See application file for complete search history.

(56) References Cited

U.S. PATENT DOCUMENTS 4,972,494 A * 11/1990 White et al. ................ 382/143
5,611,723 A * 3/1997 Mitoma et al. ................ 451/6
5,632,205 A * 5/1997 Gordon et al. .............. 101/483
5,859,923 A * 1/1999 Petry et al. ................ 382/141
6,031,933 A 2/2000 Kumagai
6,630,998 B1 * 10/2003 Welchman et al. ......... 356/394
2001/0043757 A1 * 11/2001 Asakura ..................... 382/289
2003/0031359 A1 * 2/2003 Miki et al. .................. 382/154

* cited by examiner

*Primary Examiner*—Samir Ahmed
*Assistant Examiner*—Nathan Bloom
(74) *Attorney, Agent, or Firm*—Jacobs & Kim LLP; David Jacobs

(57) ABSTRACT

A system, methods and apparatus for rapidly and automatically orienting spherical objects, such as game balls, for subsequent downstream processing comprises a series of processing steps that can be performed at four separate, mechanically similar (or even identical) workstations. An imaging sub-system needs only one camera to image the spherical object and image the work process. The method of transposing the spherical object between work stations is simple, requiring an apparatus having only one degree of freedom to simultaneously convey and rotate spherical objects, and the system and method can automatically and rapidly determine the object's spatial orientation and change the orientation as required for downstream processing.

15 Claims, 10 Drawing Sheets

METHOD AND SYSTEM FOR AUTOMATICALLY ORIENTING A SPHERICAL OBJECT

CROSS-REFERENCE TO RELATED APPLICATION

This nonprovisional patent application is based upon and claims priority from U.S. provisional patent application Ser. No. 60/401,603, filed 07 Aug. 2002, entitled METHOD AND APPARATUS FOR AUTOMATICALLY ORIENTING A SPHERICAL OBJECT, and U.S. provisional patent application Ser. No. 60/402,157, filed 09 Aug. 2002, entitled METHOD AND APPARATUS FOR AUTOMATICALLY ORIENTING A SPHERICAL OBJECT.

BACKGROUND OF THE INVENTION

1. Field of the Invention

This invention relates to a system and method for automatically orienting a spherical object, particularly a game ball, based on an existing "reference" pattern or indicium on the surface of the spherical object so that additional processing, e.g., printing, inspecting, etc. can take place on the spherical object at a target point that has a predetermined positional relationship with respect to the existing reference pattern or indicium.

2. Description of Prior Art

A growing segment of the golf ball industry is the manufacturing of balls customized with corporate logos, country club emblems, personal names, etc. These balls are usually produced by taking a finished golf ball and adding the custom printing at a predetermined location relative to the existing trade name or indicium printed on the ball. This is most commonly done by manually orienting the ball and placing it into a printing machine. Some of the problems with this method are: 1) it is labor intensive and therefore expensive, 2) it requires a significant training period for a person to become proficient at it, 3) a person is subject to fatigue and must take frequent breaks, 4) the process requires a great deal of repetitive motion, which can be source of injury, and 5) the accuracy is not as good as the system described herein.

U.S. Pat. No. 5,632,205 to Gordon (1997) describes a method of automatically orienting a game ball. This method uses a single station to perform the entire orientation on a single ball at a time. Two conical wheels are used to support the ball and rotate it around two orthogonal axes depending on whether the wheels are rotated in the same or opposite directions. The third axis of rotation is achieved by making two moves using the first two axes. The limitations of this method are: 1) operating rates are low, due to the fact that it performs the orientation on only one ball at a time, 2) the amount of time it takes to orient the ball can vary significantly depending on the initial orientation of the ball, making it difficult to synchronize the ball-orienting apparatus with the printing apparatus, which is usually designed to run at a fixed cycle rate, and 3) the area sensor camera photographs only a limited area of the surface of the ball at one time, therefore more images need to be acquired and, hence more time to process such images.

U.S. Pat. No. 5,611,723 to Mitoma (1997) describes another method of automatically orienting a golf ball in two dimensions for the purpose of removing molding burrs and flash from the equator of the ball. The Mitoma method describes a sequential arrangement that allows a different ball to be at each station of the orientation process simultaneously. The limitations of this system are that it requires six stations and three cameras to orient the ball in only two dimensions. The individual stations are mechanically and spatially complex because their orthogonal arrangement requires such stations to be considerably different from one another. Additionally, the conveyance arm that transports the balls from one station to the next adjacent station requires two degrees of freedom, one to lift and place the balls and another to transport them, therefore operating rates are low.

BRIEF SUMMARY OF THE INVENTION

The apparatus and method according to the present invention, as described herein, is an automatic orientation system and process comprising a series of processing steps that can be performed at four separate, mechanically similar, "work" stations, with spherical objects being simultaneously subjected to different processing operations at each of the individual work stations. The system having such a working configuration facilitates the process that allows higher operating rates to be achieved and for spherical objects having a predetermined required orientation (for additional downstream processing) to be produced at repeatable time intervals. The system and process according to the present invention utilizes an imaging system having only one camera as a necessary element for managing the work-flow process. The method of transposing the spherical objects between work stations is simple, requiring an apparatus that requires only one degree of freedom to simultaneously convey and rotate spherical objects.

There are two main objectives of this invention. The first is to provide a system and method that can automatically determine the spatial orientation of a spherical object, such as a game ball, by locating and identifying the position and two-dimensional orientation of an existing reference indicium such as a trade name, e.g., TOP-FLITE or TITLEIST brands for golf balls, or a graphical image or a pattern, such as a dimple pattern on a golf ball, etc., on the spherical object. The second objective of the system and method of the present invention is to manipulate the spatial orientation of the spherical object in the context of the defined position and two-dimensional orientation of the reference indicium so that an additional processing operation, e.g., printing, inspecting, etc., can take place at a predetermined location, i.e., the "target point", on the spherical object, i.e., the target point has a predetermined positional relationship with respect to the predetermined final position and two-dimensional orientation of the reference indicium.

One preferred method according to the present invention for orientating a spherical object, as described herein, utilizes a system having four work stations. Two "locating" work stations, each with an axis of rotation that passes through the center of the spherical object, are used to gather data by means of an imaging system such as a line sensor camera to accurately determine, i.e., "define", the position and two-dimensional orientation of the reference indicium on the spherical object and, hence the current spatial orientation of the spherical object in terms of the defined reference indicium. Additionally, the described method uses three "orienting" work stations, each with an axis of rotation that passes through the center of the spherical object, to manipulate the spherical object in the context of the defined position and two-dimensional spatial orientation of the reference indicium (as determined by the procedures implemented at the "locating" work stations) to move the reference indicium to the final predetermined position and two-dimensional orientation so that the "target" point on the surface of the spherical object, where an additional processing operation is to be performed, e.g., printing, inspecting, or some other type of operation, is presented in the required location and orientation or perspective for such additional processing. For the described embodiment, the second "locating" work station of the system that is used in determining or defining the position and two-dimensional orientation of the reference indicium on the spherical object also functions as the first "orienting" station used for manipulating the spatial orientation of the spherical object, resulting in the system having total of four work stations for automatically orienting a spherical object according to the present invention.

OBJECTS AND ADVANTAGES

Accordingly, the objects and advantages of the present invention are:

a) To orient a spherical object, in the context of the defined position and two-dimensional orientation of an existing reference indicium on the spherical object, at a high operating rate;

b) To orient a spherical object, in the context of the defined position and two-dimensional orientation of an existing reference indicium on the spherical object, at a substantially repeatable time interval;

c) To orient a spherical object, in the context of the defined position and two-dimensional orientation of an existing reference indicium on the spherical object, by performing a minimal number of processing steps over a series of work stations using as few as one imaging device;

d) To transport a spherical object from one work station to a next adjacent work station while simultaneously rotating the spherical object using a mechanism having only one degree of freedom.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DESCRIPTION OF THE PREFERRED EMBODIMENTS

The system and method according to the present invention for automatically orienting a spherical object utilizes Euler's rotation theorem that states that any object can be moved from any initial orientation to any desired orientation by rotating it through three angles. These angles are known as the Euler angles .phi., .theta., and .psi. The first angle .phi. is the angle of rotation about a first axis. The second angle .theta. is the angle of rotation about a second axis, wherein the second axis is perpendicular to the first axis. The third angle .psi. is the angle of rotation about a third axis, wherein the third axis is perpendicular to the second axis.

Figure 1:
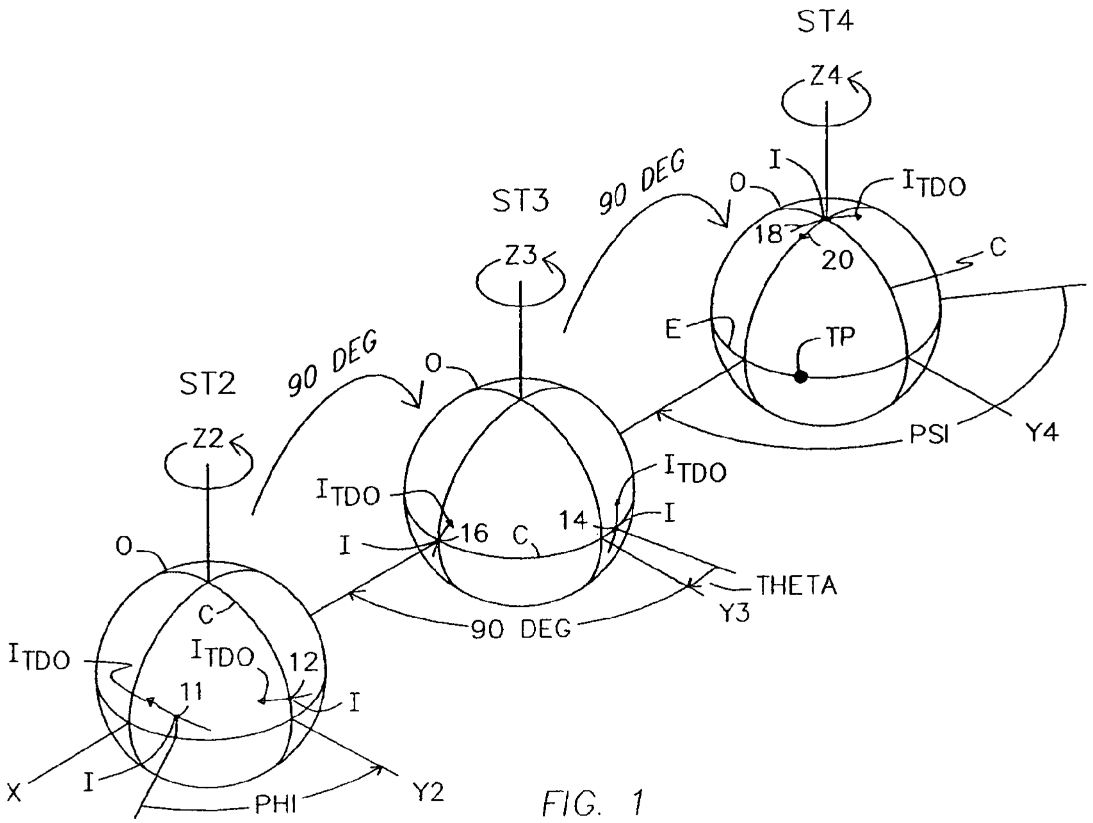
FIG. 1 is an isometric view of the "orienting" steps performed to orient a spherical object with respect to a reference indicium having a defined location and two-dimensional orientation using three work stations according to the present invention.
Figure 1A:
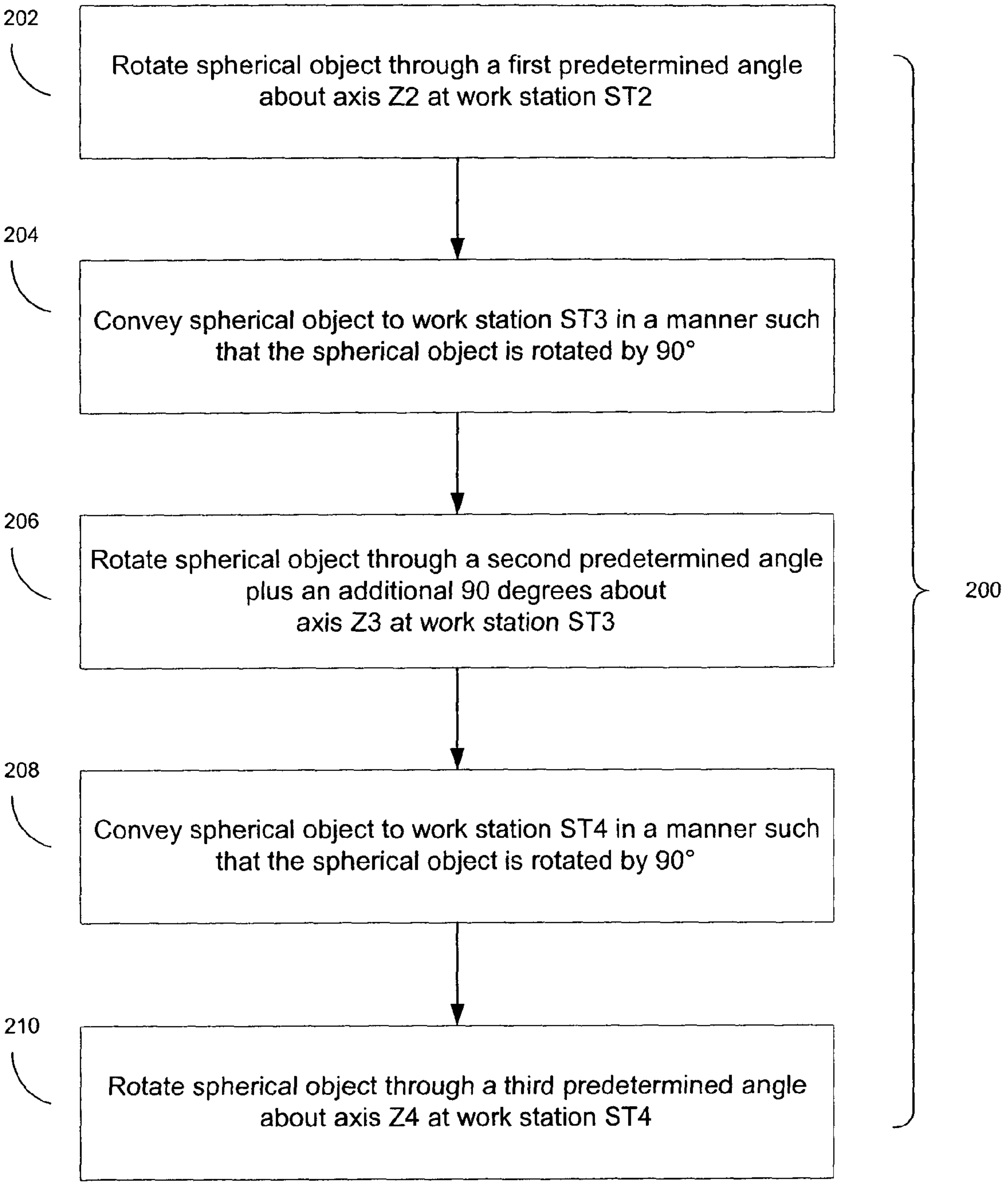
FIG. 1*a* is a flow chart of the "orienting" steps of FIG. 1.

Referring now to the drawings wherein like reference characters identify corresponding or similar elements throughout the several views, FIGS. 1, 1*a* depict the processing steps required to orient a spherical object such as a golf ball, in the context of the position and two-dimensional orientation of an existing "reference" indicium on the object's surface for the purpose of locating a target point (where the target point has a predetermined positional relationship with respect to the existing reference indicium) on the spherical object in a predetermined location and two-dimensional orientation for additional processing, e.g., printing, inspecting. The terminology "reference indicium" as used herein refers to any mark existing on the surface of the spherical object, such as manufacturer's trade name or logo, player number, and ball type, or a pattern on the surface of the spherical object, such as a dimple pattern on a golf ball. The term two-dimensional orientation refers to the "attitude" of the reference indicium on the surface of the spherical object such that a "word(s)" reference indicium is readable from left to right or a "graphical" reference indicium is right-side up. The spherical object is oriented by rotating it through the three Euler angles, each at a separate "orienting" work station, ST2, ST3, and ST4, respectively, wherein each orienting work station has a single axis of rotation, Z2, Z3, and Z4, respectively, that are parallel and coplanar with one another. The steps described in the following paragraphs assume that the position and two-dimensional orientation of the existing reference indicium has been defined or determined (as discussed in further detail below) and that the predetermined positional relationship of the target point with respect to the defined position and two-dimensional orientation of the reference indicium is known so that orienting the reference indicium to a predetermined final position and two-dimensional orientation concomitantly positions the target point for additional processing.

Referring now to the drawings wherein like reference numerals identify corresponding or similar elements throughout the several views, a spherical object O is depicted in FIG. 1 wherein such spherical object O includes an existing reference indicium I at a defined position 11 at the first orienting work station ST2. The indicium I also has a defined two-dimensional orientation represented by the reference arrow $I_{TDO}$ wherein the direction of the arrow indicates that a "word" indicium is readable from left to right and/or that a graphical indicium is properly positioned for viewing, e.g., right-side up. The method 200 or steps required to orient the spherical object O include a first step 202 wherein the spherical object O is rotated through a predetermined angle .phi about the rotational axis Z2 at the first orienting work station ST2. The resultant location of the reference indicium I as a result of such rotation is identified as a first reference position 12 lying on a circle C. The circle C is defined by the intersection of the surface of the spherical object O with a plane that contains the axis of rotation Z2 and is perpendicular to the X axis of the reference coordinate system.

In a second step 204, the spherical object O is conveyed (by the apparatus described in further detail below) from the first orienting work station ST2 to the next adjacent or second orienting work station ST3 in a manner such that the spherical object O is rotated 90 degrees about an axis passing through the center of the spherical object O coincident with the Y axis of the reference coordinate system (see reference character Y2 in FIG. 1) such that the circle C is rotated 90 degrees. As a result the circle C coincides with the equator of the spherical object O at the second orienting work station ST3 and the reference indicium I is now located at a second reference position 14 on the circle C of the spherical object O at the second orienting work station ST3 and has the two-dimensional orientation indicated by the arrow $I_{TDO}$. The spherical object O is then rotated, in a third step 206, through a predetermined angle .theta at the second orienting work station ST3 to temporarily position the reference indicium I at the intersection of the circle C and the plane passing through the rotational axis Z3 perpendicular to the X-axis, and is then rotated further through an additional 90 degrees about the axis Z3 at the second orienting work station ST3. The additional 90 degrees of rotation is required to locate the reference indicium I at a third reference position 16 at the intersection of the circle C and the X reference axis at the second orienting work station ST3.

In a fourth step 208 the spherical object O is then moved or conveyed to the last or third orienting work station ST4 in such a manner that the spherical object O is rotated 90 degrees about an axis coincident with the Y axis of the reference coordinate system (see reference character Y3 in FIG. 1) such that the circle C is rotated through 90 degrees. This results in the reference indicium I being moved to a final reference position 18 on the pole of the spherical object O that is coincident with the rotational axis Z4 at the last orienting work station ST4 wherein the reference indicium I has the two-dimensional orientation indicated by the arrow $I_{TDO}$. The spherical object O is then rotated, in a fifth step 210, through a predetermined angle .psi about the axis Z4 to bring the two-dimensional orientation $I_{TDO}$ of the reference indicium I into the desired final position, i.e., the final reference position 20, wherein the two-dimensional orientation $I_{TDO}$ of the reference indicium I is aligned with a plane coincident with the X-axis and perpendicular to the equator E of the spherical object O.

As an examination of FIG. 1 indicates, the target point TP is now positioned at the equator E of the spherical object O, and is properly positioned for additional processing. In one preferred embodiment of the present invention, the spherical object O can be subjected to additional processing at this third orienting work station ST4 due to the configuration of the transposing apparatus according to the present invention (as described in further detail below). In an alternative preferred embodiment, the spherical object O can be transferred to an additional processing work station (not shown). Transference of the spherical object O to the additional processing work station can be achieved in any number of ways. For example, the spherical object O can be conveyed to the additional processing work station in a manner such that the spherical object O retains the spatial orientation that it has at the third orienting work station ST4 after completion of step 210. Or, alternatively, for example, a transposing apparatus having the functional capabilities of the transposing apparatus according to the present invention can be used to convey the spherical object O to the additional processing work station. In this embodiment, it will be appreciated that the spherical object O will be subjected to 90 degrees rotation such that the target point TP will have a new spatial location at the additional processing work station (i.e., at the third orienting work station ST4 illustrated in FIG. 1 the target point TP is located on the equator E midway between the circle C and a plane perpendicular to the circle C and coincident with the X-axis whereas at the additional processing work station, the target point TP would be located on the surface of the spherical object O at the midpoint of a circle defined by a plane coincident with the Y-axis perpendicular to the X-Y plane (see X, Y4 in FIG. 1), i.e., the equator E depicted at the final orienting work station ST4 would be rotated 90 degrees to the position occupied by the circle C as depicted at the third orienting work station ST4 in FIG. 1. One skilled in the art will appreciate that other schemes for transferring the spherical object O from the final orienting work station ST4 to the additional processing work station could be utilized in conjunction with the present invention.

The target point TP described in the preceding paragraphs was selected for the purpose of illustrating and describing the features of the present invention. In particular, this target point TP, which has a predetermined positional relationship with respect to the predetermined final position and two-dimensional orientation of the reference indicium I defined by a 90 degrees arc segment, was selected since it would be visible at the final orienting work station ST4, but not visible at the first and second orienting work stations ST2, ST3. One skilled in the art will appreciate that the invention of the present application will accommodate any predetermined positional relationship between an existing reference indicium and a selected target point, where the selection of the target point is a business consideration outside the scope of the present invention.

The Euler angles required to orient the spherical object O, in the context of the predetermined final position and two-dimensional orientation of the existing reference indicium I, are calculated by accurately measuring the position and two-dimensional orientation of the existing reference indicium I on the spherical object O to define or determine the actual position and two-dimensional orientation of the spherical object O at the first orienting work station ST2 prior to implementing any of the orienting steps described above. This is accomplished by taking images, e.g., two photographs, which together encompass the entire surface area of the spherical object O and using conventional image processing techniques to accurately determine or define the position and two-dimensional orientation of the existing reference indicium I on the spherical object O. The term "image" as used herein refers to using an imaging system such as a line sensor camera and image acquisition device to gather a plurality of line data from the line sensor camera while the spherical object O is rotated at least one revolution about an axis that passes through the center of the spherical object O and is perpendicular to the image axis of the line sensor camera (see, e.g., reference numeral 28 in FIG. 2 which identifies a line sensor camera and reference character $\mathbf{28}_{IA}$ which identifies the image axis of the line sensor camera 28 in FIG. 2). It will be understood by those skilled in the art that other types of imaging systems can be used in the practice of the present invention such as area scan cameras, and other imaging systems of like capability.

The plurality of line data is then assembled by an image acquisition device into a two dimensional image representing the surface of the spherical object O from nominally 50 degrees below to nominally 50 degrees above the equator of the spherical object O. This two-dimensional image embodies two image axes (see reference characters $\mathbf{28}_{IA}$ and $\mathbf{30}_{IA}$ in FIG. 2) that are perpendicular with respect to the frame of reference of the spherical object O (see, e.g., reference axes X, Y1, Z1 and X, Y2, Z2, respectively, in FIG. 2).

In one embodiment, the spherical object is a golf ball and the target point is selected to have a predetermined positional relationship, i.e., a predetermined location, relative to an existing reference indicium imprinted on the golf ball, e.g., manufacturer's trade name or logo. In order to accurately determine/define the position (and two-dimensional orientation) of the reference indicium, and hence the predetermined location (and two-dimensional orientation) of the target point, the existing reference indicium is first moved so that it is near the equator of the spherical object when photographed by the line sensor camera. The purpose of this move is to prevent the reference indicium from being truncated by the edge of the second image made by the line sensor camera. Moving the reference indicium near the equator of the spherical object has the additional advantage of reducing distortion due to the curvature of the spherical object, hence increasing the accuracy of the definition/determination of the position and two-dimensional orientation of the reference indicium on the surface of a spherical object such as a golf ball.

Figure 2:
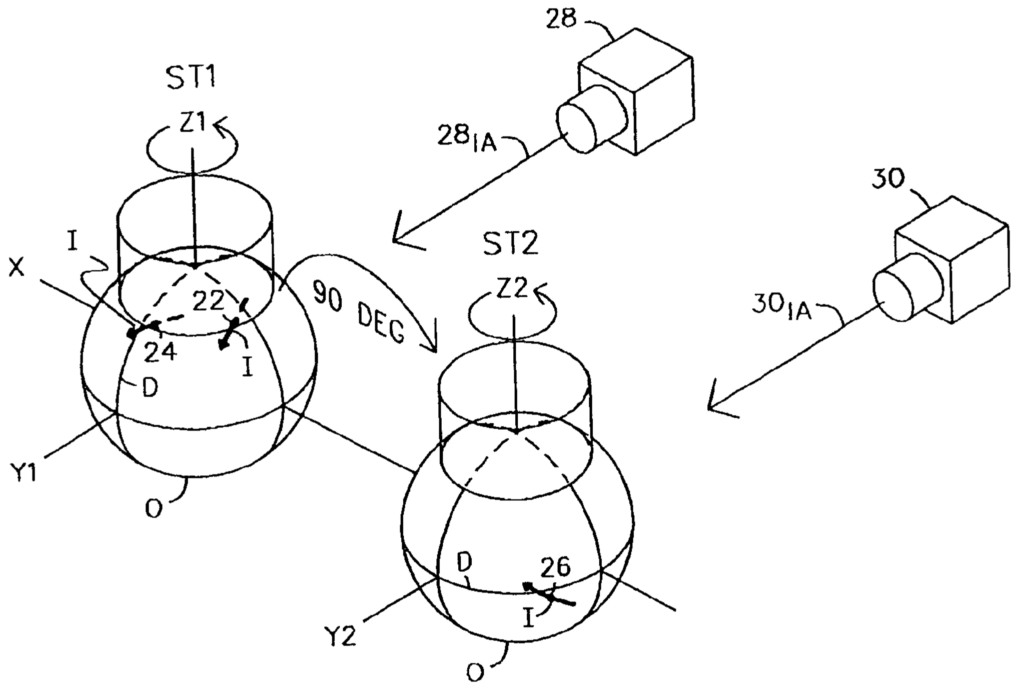
FIG. 2 is an isometric view of the "locating" steps performed on a spherical object to accurately determine or define the position and two-dimensional orientation of an existing reference indicium on the object's surface.

Referring to FIG. 2, an image is made at each of two adjacent "locating" work stations ST1, ST2. The first locating workstation ST1 serves the purpose of imaging the surface of the spherical object and then positioning the spherical object O based on information extracted from the first image so that the existing reference indicium I will be near the equator when the second image is acquired at the second locating work station ST2. The first image extracted at the first locating work station ST1 serves to identify the coarse position of the reference indicium I by locating the reference indicium I in the image and correlating it with stored reference data representing the spherical object O with its reference indicium I using conventional software known to those skilled in the art, e.g., pattern-matching software.

Figure 2A:
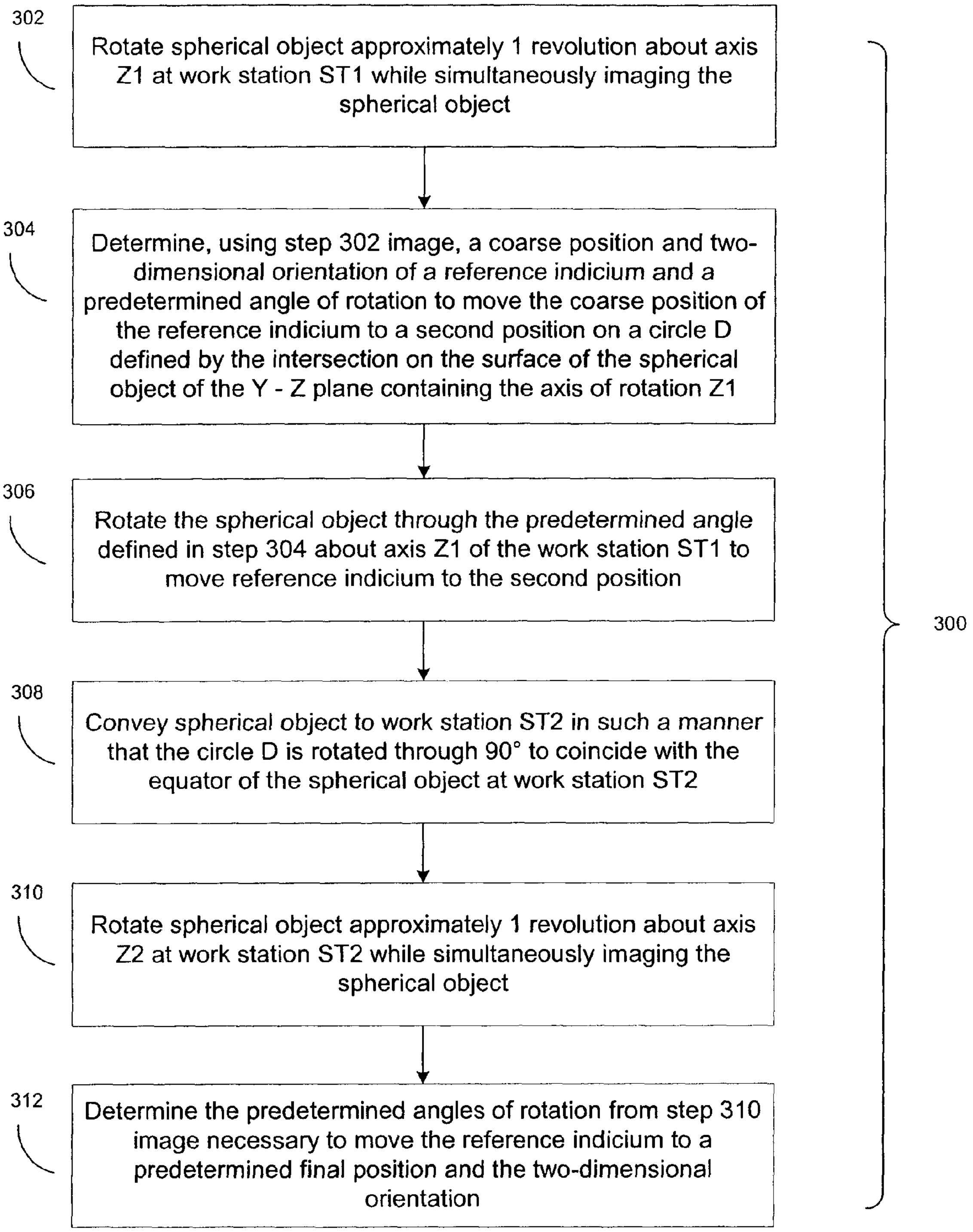
FIG. 2*a* is a flow chart of the "locating" steps of FIG. 2.
Figure 3:
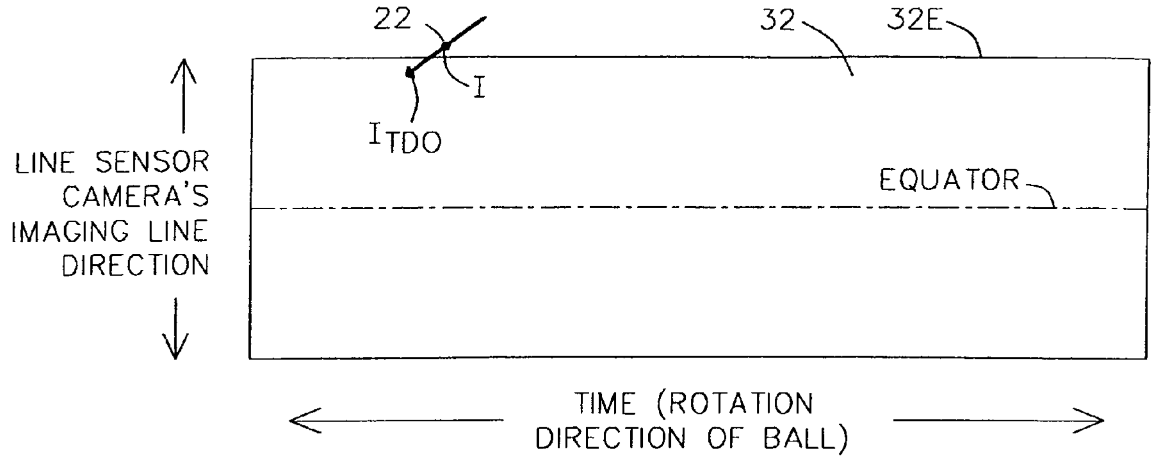
FIG. 3 is a pictorial representation of the resulting image of a spherical object produced by an imaging system such as a line sensor camera at a first locating work station ST1.

FIGS. 2, 2*a* depict the method 300 or steps required to take a randomly oriented spherical object O having an existing reference indicium I on the surface thereof at the first locating workstation ST1 and move the spherical object O so that the reference indicium I is located near the equator thereof when the spherical object O is conveyed to the second locating work station ST2 wherein the position and two-dimensional orientation of the indicium can be more accurately defined/determined. In a first step 302, the spherical object O is rotated approximately one revolution about axis Z1 at the first locating work station ST1 while an imaging system, i.e., the first line sensor camera 28 depicted in FIG. 2, images the surface of the spherical object O. FIG. 3 shows an illustrative example of the ST1 image 32 provided by the first line sensor camera 28 shown in FIG. 2. Next, in a step 304 a first or coarse position 22 of the reference indicium 32 (and its two-dimensional orientation) is identified in the ST1 image 32 using one of the conventional image processing techniques known to those skilled in the art, e.g., pattern matching, blob analysis (using the stored reference data representing the graphical configuration of the spherical object O and its reference indicium I). The first or coarse position 22 of the reference indicium I (and the corresponding two-dimensional orientation thereof as indicated by $I_{TDO}$) is exemplarily depicted in FIGS. 2, 3. An examination of FIG. 3 shows that the image of the reference indicium I is partially truncated by the edge 32E of the ST1 image 32. Simultaneously in step 304 the conventional image processing techniques are used to determine a predetermined angle of rotation necessary to move the coarse position 22 to coincide with a circle D on the spherical object defined by the intersection of the Y-Z plane (see coordinate axes Y1, Z1 in FIG. 2), which includes the axis of rotation Z1 and is perpendicular to the X reference axis, with the surface of the spherical object O.

Once the coarse position 22 of the reference indicium I and the predetermined angle of rotation have been identified in step 304, the spherical object O is rotated about the axis Z1 at the first locating work station ST1 in a step 306 to move the reference indicium I from the coarse position 22 to a second position 24 on the circle D as illustrated in FIG. 2.

Next, in a step 308 the spherical object O is conveyed to the next adjacent or second locating work station ST2 in a manner that causes the spherical object O to be rotated 90 degrees about an axis passing through the center of the spherical object O that is coincident with the Y axis of the reference coordinate system (see reference character Y1 in FIG. 2). The step 308 rotation moves the circle D, which at the first locating work station ST1 defined a plane perpendicular to the X-axis, so that it coincides with the equator of the spherical object O at the second locating work station ST2, i.e., in the X-Y plane (see coordinate axis Y2 in FIG. 2). This results in the reference indicium I moving from the second position 24 on the spherical object O at the first locating work station ST1 to a third reference position 26 near the circle D or equator of the spherical object O at the second locating work station ST2 as a result of step 108. The third reference position 26 of FIG. 2 corresponds to the defined position 11 and two dimensional orientation of the spherical object O at the first orienting work station ST2 depicted in FIG. 1.

Figure 4:
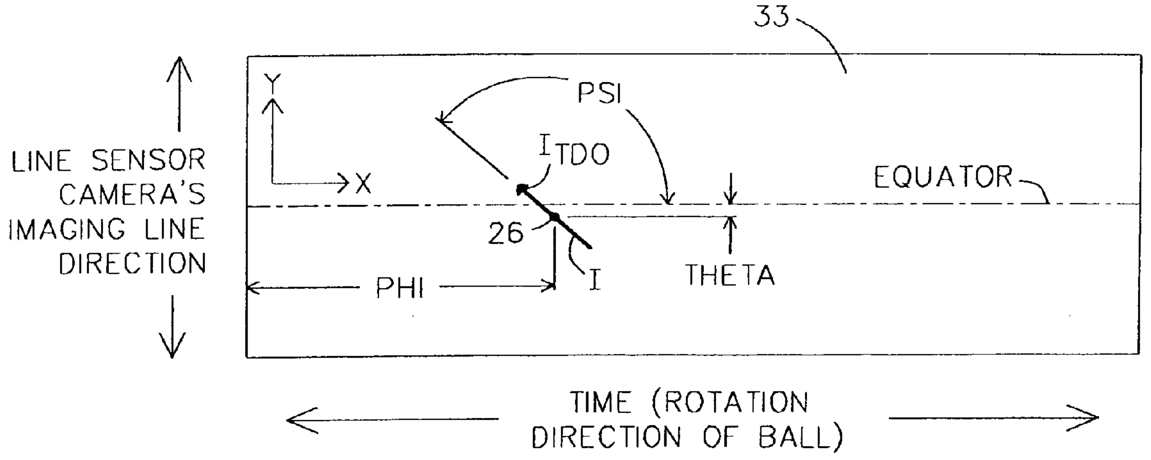
FIG. 4 is a pictorial representation of the resulting image of the spherical object produced by an imaging system such as a line sensor camera at the second locating work station ST2 after being partially oriented at the work station ST1 of FIG. 3.

Then, in step 310, the spherical object O is imaged at the second locating work station ST2 using the imaging system, i.e., the second line sensor camera 30 depicted in FIG. 2 (which has an image axis $\mathbf{30}_{IA}$), while the spherical object O is rotated at least one revolution about the axis Z2. The image resulting from step 310, the ST2 image 33, is depicted in FIG. 4. The three Euler angles .phi, .theta, and .psi are derived from information in the ST2 image 33 in step 312 using any conventional technique know to those skilled in the art, e.g., blob analysis, or pattern matching. The first Euler angle .phi is directly related to the X value of the ST2 image 33. The second Euler angle .theta is directly related to the Y distance from the equator of the spherical object O of the ST2 image 33. The third Euler angle .psi is directly related to the two-dimensional orientation of the reference indicium I (see reference character $I_{TDO}$ in FIG. 4) which is the angle of the reference indicium I with respect to the X axis of the ST2 image 33.

While the method 300 or steps described in the preceding paragraphs involve the manipulation and imaging of the spherical object O for the purposes of: (i) identifying the defined position 26 and two dimensional orientation of a reference indicium I on the spherical object O; and (ii) determining three predetermined angles (the Euler angles .phi, .theta+90°, and .psi) required to automatically orient the spherical object using the three "orienting" work stations ST2, ST3, ST4, and steps described above with respect to FIG. 1, to enable movement of the reference indicium I to the predetermined final position 20 and two-dimensional orientation so that a target point is prepositioned for further processing, one skilled in the art will appreciate that the method 300 or steps and work stations ST1, ST2 described above can be adapted for other purposes.

Figure 6:
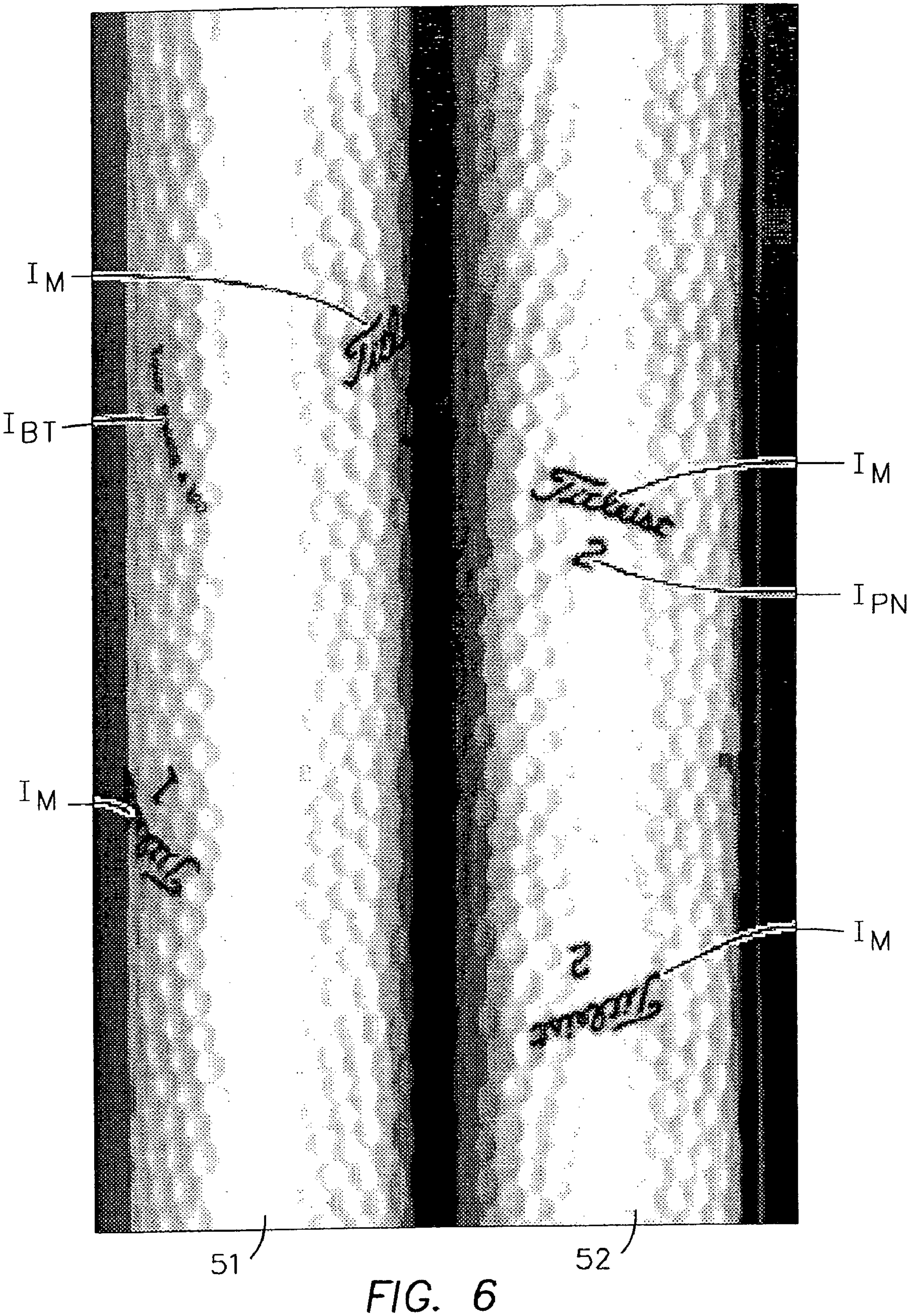
FIG. 6 is the image produced by the imaging system of FIG. 5*a* to simultaneously image a spherical object at station ST1 and station ST2.

For example, steps 302, 308, and 310 as described above can be implemented using the work stations ST1, ST2 to generate, using an embodiment of an imaging system described herein, two distinct perspective images (see, e.g., reference numerals 51, 52, in FIG. 6) of the surface of the spherical object O. These individual perspective images 51, 52 can be juxtaposed to form a composite image as depicted in FIG. 6, which can be converted to a "virtual image" (electronic image) of the surface of the spherical object. This virtual image can then be subjected to further processing, e.g., inspection, by automatically comparing such virtual image to stored reference data representing the standard graphical configuration of the surface of the spherical object O using conventional processing software and techniques such as pattern matching, blob analysis, to identify any discrepancies between the virtual image and the standard graphical configuration of the surface of the spherical object. Such a virtual inspection technique, for example, can be used to ensure that existing reference indicia that are typically found on a golf ball, e.g., manufacturer's brand name $I_M$, ball type $I_{BT}$, and player number $I_{PN}$, have been properly applied to golf balls on a processing line.

In one embodiment an image processing technique is implemented as conventional software instructions by a processing unit (see reference numeral 100 in FIG. 10) to manipulate the ST 1. ST2 images 32, 33, respectively, to determine the Euler angles as follows: In a first step, the scanned line data representing the original ST1, ST2 images 32, 33, respectively, are converted to binary images (binary images consist of pixels having two intensity values, black or white). If necessary, the processing unit is further operative to invert these binary images by changing the white surface of a spherical object such as a golf ball to black pixels and the black representing the reference indicium to white pixels. Next, the processing unit is operative to fill in the black pixels surrounding the white pixels to eliminate any black spots within the reference indicium and to ensure that the constituent elements comprising a particular reference indicium are all connected. The processing unit is further operative to locate each white subpart in the binary image and compute its centroid, area, and axes of gyration.

Then, the processing unit correlates area and relative position information from these binary images with stored reference data representing the graphical image of the spherical object and its reference indicium to identify the particular reference indicium currently being used as the reference standard for orientating the spherical object. The processing unit is then operative to fit the binary images of the imaged reference indicium with a previously stored binary image of the reference indium on the spherical object and computes the three Euler angles from relative positions and two-dimensional orientations of the imaged reference indium and the stored binary image of the reference indicium. The first Euler angle .phi is a function of the X position differential between the imaged and stored reference indiciums, the second Euler angle .theta is a function of the Y position differential between the imaged and stored reference indiciums, and the third Euler angle .psi. is a function of the angular differential of the major radii of gyration of the imaged and stored reference indiciums. It will be understood by those skilled in the art that other types of image processing techniques are also possible, including e.g., pattern matching and others.

Figure 5A:
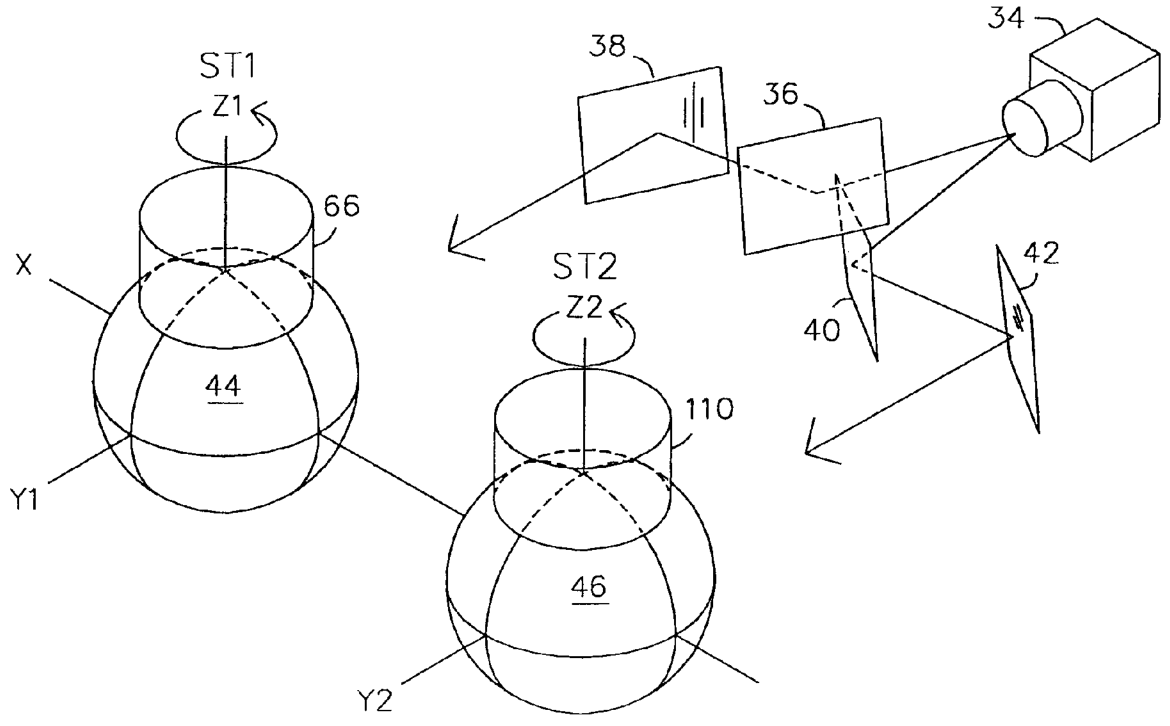
FIG. 5*a* is an isometric view of an imaging system comprising a single camera and system of mirrors that enables the camera to simultaneously image a spherical object at the first and second locating work stations ST1, ST2.

In another preferred embodiment of the present invention, an imaging system includes a plurality of mirrors, thereby allowing a single line sensor camera to be used to image one spherical object at the first locating workstation ST1 while simultaneously imaging another spherical object at the second locating work station ST2, thereby reducing the system cost and complexity by eliminating one of the two line cameras illustrated in the FIG. 2 embodiment of the system according to the present invention. FIG. 5*a* depicts this preferred embodiment of such an imaging system which comprises a single line sensor camera 34 and four mirrors 36, 38, 40, 42. A first set of mirrors 36, 38 is aligned to capture the ST1 image of the spherical object 44 at the first locating work station ST1. More specifically, the secondary mirror 36 reflects the field of view of the line sensor camera 34 towards the primary mirror 38. The primary mirror 38 reflects the field of view of the line sensor camera 34 towards the spherical object 44 at the first locating work station ST1.

In a similar manner a second set of mirrors 40, 42 is aligned to capture the ST2 image of a spherical object 46 at the second station ST2. More specifically, the secondary mirror 40 reflects the field of view of the line sensor camera 34 towards the primary mirror 42. The primary mirror 42 reflects the field of view of the line sensor camera 34 towards the spherical object 46 at the second locating workstation ST2.

Figure 5B:
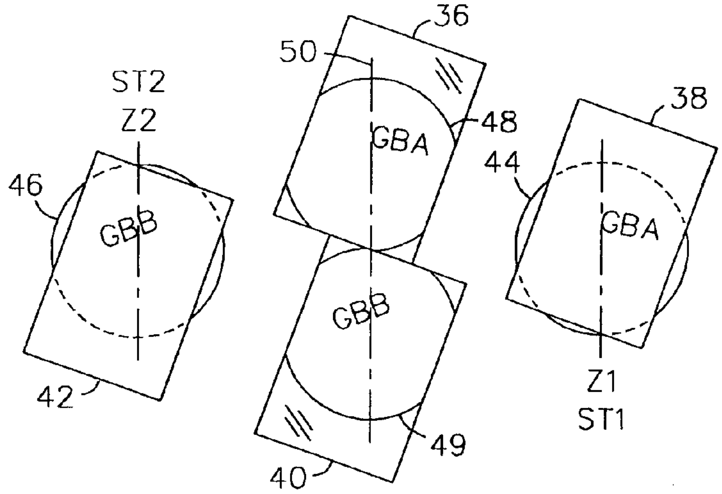
FIG. 5*b* is a camera's eye view of the resultant image of the spherical object produced by the imaging system of FIG. 5*a*.

The result is a camera view as shown in FIG. 5*b* consisting of an apparent image 48 of the spherical object 44 at the first locating work station ST1 positioned above an apparent image 49 of the spherical object 46 at the second locating work station ST2. The axis of rotation 50 of the apparent image 48 of the spherical object 44 at the first locating work station ST1 is positioned along the same line as, i.e., coincident with, the axis of rotation of the apparent image 49 of the spherical object 46 at the second locating work station ST2. The merged axes of rotation of the two apparent images 48, 49 is then focused onto the line sensor camera 34 allowing both spherical objects 44, 46 to be imaged, i.e., line scanned, simultaneously. The resultant line sensor image is depicted in FIG. 6 and contains the image 51 of the spherical object at the first locating work station ST1 and the image 52 of the spherical object at the second locating work station ST2. Since the exemplary images 51, 52 depicted in FIG. 6 were derived from a golf ball as the spherical object, also depicted in FIG. 6 are various types of existing reference indicia that are typically found on a spherical object such as a golf ball, to wit the manufacturer's brand name $I_M$, the ball type $I_{BT}$, and the player number $I_{PN}$, any one of which can be selected to function as the reference indicium for orienting the golf ball utilizing the system and method of the present invention.

Figure 7:
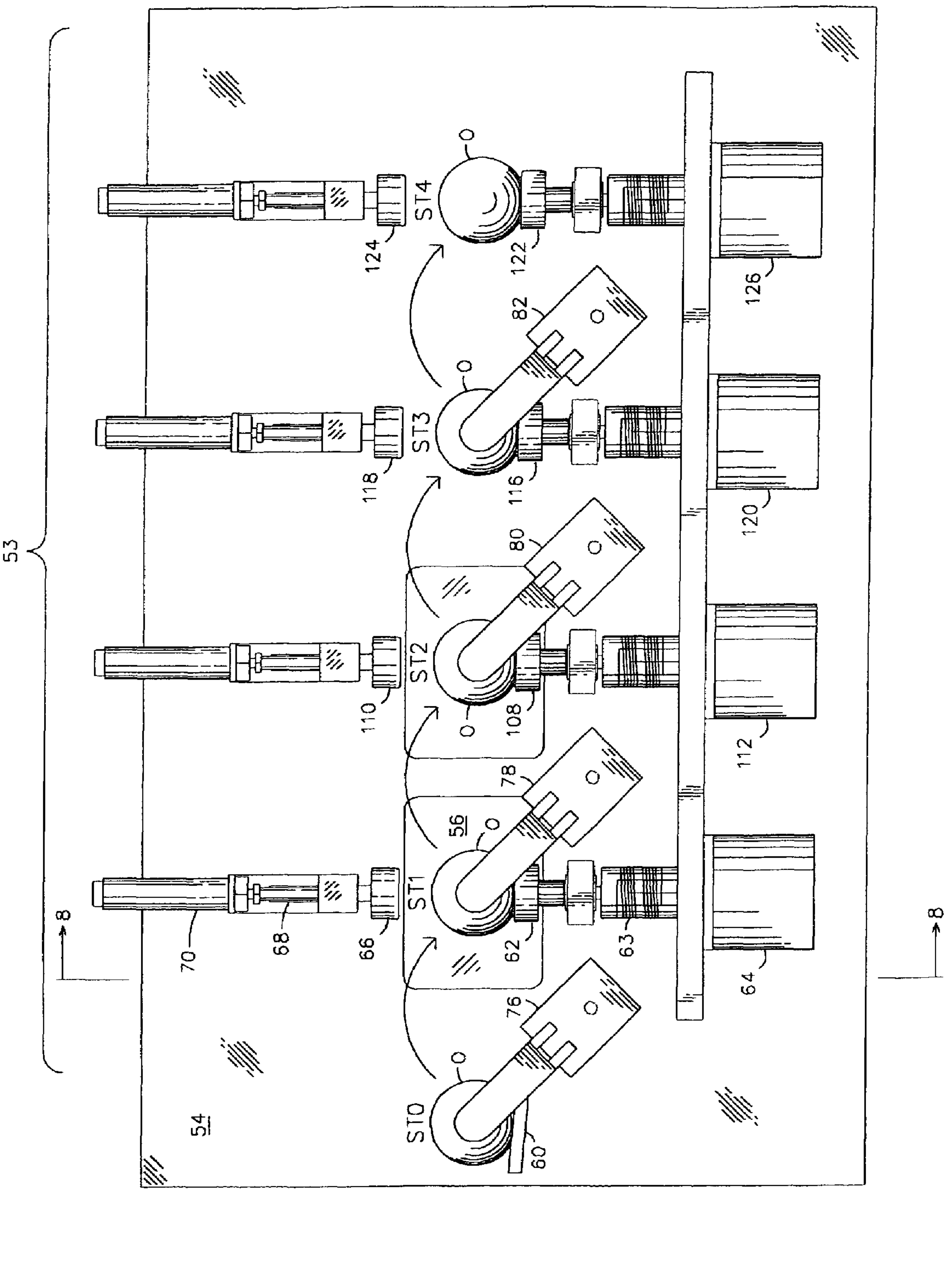
FIG. 7 is the front view of a preferred embodiment of an apparatus utilized in the system according to the present invention for orienting spherical objects, in the context of the defined position and two-dimensional orientation of an existing reference indicium on the surface of such objects.

A front view of one preferred embodiment of an apparatus 53 of the system for automatically orienting spherical objects according to the present invention is illustrated in FIG. 7. The apparatus 53 comprises one pickup work station ST0 and four processing work stations ST1, ST2, ST3, and ST4, as described above, with all five work stations ST0, ST1, ST2, ST3, ST4, being disposed in a linear arrangement with equal spacing between adjacent work stations as illustrated in FIG. 7. A series of four transposing mechanisms 76, 78, 80, 82, one located between the pickup work station ST0 and the first processing work station ST1 and one between the first and second, second and third, and third and fourth processing work stations ST1-ST2, ST2-ST-3, ST3-ST4, respectively, serve two purposes, i.e., implement two separate and distinct functions.

The first purpose or function implemented by the transposing mechanisms 76, 78, 80, 82 is to provide the means to physically convey or transport a spherical object from one work station to the next adjacent work station. The second purpose or function of the transposing mechanisms 76, 78, 80, 82 is to position the spherical object being moved so that the axis of rotation of the spherical object at the new work station is perpendicular to the axis of rotation at the previous work station. The five work stations ST0, ST1, ST2, ST3, ST4 and four transposing mechanisms 76, 78, 80, 82 are all mounted to a support plate 54. A spherical object starts in a random orientation at the pickup work station ST0 and is conveyed serially and sequentially through the individual processing work stations ST1, ST2, ST3, ST4, to end up with the reference indicium in the predetermined final position and two-dimensional orientation at the last processing work station ST4 (see reference numeral 20 in FIG. 1) such that the target point is definitively located for additional processing. For this described embodiment, the first two processing work stations ST1, ST2 automatically perform the "locating" function with respect to an existing reference indicium on the spherical object, i.e., define the position and two-dimensional orientation of the reference indicium. The last three processing work stations ST2, ST3, ST4 automatically perform the "orientating" function described above with respect to the reference indicium, i.e., sequentially transpose the position and two-dimensional orientation of the "identified" reference indicium by rotating the spherical object O sequentially through a plurality of predetermined angles (the Euler angles .phi, .theta, and .psi as determined and described above) so that the target point is definitively positioned for additional processing.

The pickup work station ST0 is a station to which a randomly-oriented spherical object is supplied from a previous process, e.g., the manufacturing process, the pickup work station ST0 having a cup 60 on which the spherical object O is placed as shown in FIG. 7. In the following discussion, the spherical objects are all identified by the reference character "O" since the spherical objects are fungible (except for the location and two-dimensional orientation of the reference indicium on the individual spherical objects).

The first, second, third, and fourth processing work stations ST1, ST2, ST3, ST4 are mechanically similar and serve the purpose, inter alia, of rotating the spherical object O through a predetermined angle about a vertical axis that passes through the center of the spherical object O at each work station. FIG. 7 shows the first processing work station ST1 having a bottom cup 62 on which the spherical object O is placed and a means for rotating the bottom cup 62 that comprises a stepper motor 64 connected to the bottom cup 62 by a coupling 63. The bottom cup 62 covers an area of the spherical object O that extends to nominally 30 degrees, but no more than 40 degrees, from the bottom pole of spherical object O. The bottom cup 62 has a surface made from nominally low durometer rubber or polyurethane for the purpose of preventing relative movement of the spherical object O with respect to the bottom cup 62 as the bottom cup 62 is rotated.

An opposing upper cup 66 is mounted to a shaft 68, the combination thereof which is operative to move up and down, i.e., away from and towards the spherical object O disposed in the bottom cup 62. The axis of the shaft 68 passes through the center of the upper cup 66 and the center of the spherical object O. The shaft 68 is concentric with the axis of rotation of the spherical object O and is connected to an actuator 70 that moves the upper cup 66 up and down for the purpose of exerting a force on the spherical object O to hold it securely against the opposing bottom cup 62.

In the preferred embodiment an air cylinder is used as the actuator 70. Another embodiment would be to use a stepper motor or servomotor as the means for actuating the shaft 68. Still another embodiment would be to eliminate the upper cup altogether and utilize a vacuum in the bottom cup 62 to hold the spherical object O in place. The upper cup 66 is mechanically coupled to the shaft 68 in such as manner as to freely rotate about the same axis as the spherical object O. When the upper cup 66 is in contact with the surface of the spherical object O the upper cup 66 covers an area of the spherical object O that extends to nominally 30 degrees, but less than 40 degrees, from the upper pole of the spherical object O. Once processing of the spherical object O at the first processing work station TS1 is complete (see description above), the actuator 70 is operative to retract the upper cup 66 upward, i.e., out of physical contact with the spherical object O, so that the spherical object O can be conveyed to the to the second processing work station ST2 by operation of the second transposing mechanism 78. The second, third, and fourth processing stations ST2, ST3, ST4 include functional elements corresponding to those described above in connection with the first processing work station ST1 (see FIG. 7).

Figure 8:
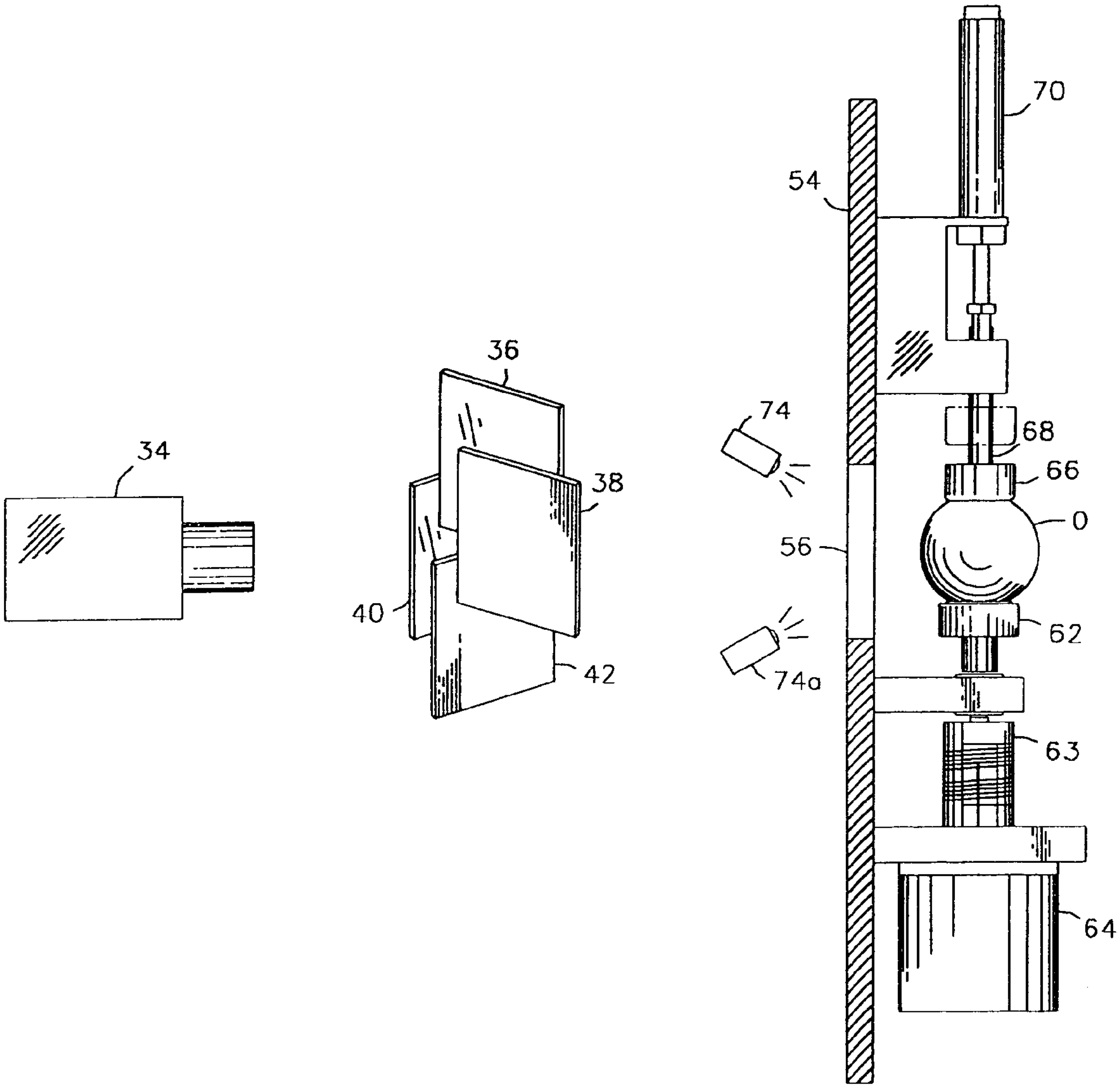
FIG. 8 is a side view showing a single work station and the orientation of the camera of an imaging system in reference to this work station.

FIG. 8 depicts the line sensor camera 34 described above used for the purpose of simultaneously imaging spherical objects O at the first processing work station ST1 and the second processing work station ST2 while the spherical objects are rotated approximately one complete revolution. The camera 34 is positioned at the same height as the center of the spherical objects O with a line of sight or image axis that is perpendicular to the linear arrangement of the four processing work stations ST1, ST2, ST3, ST4. The line sensor camera 34 is parallel to the axis of rotation of the spherical object O at the first processing work station ST1 and the axis of rotation of the spherical object O at the second processing work station ST2. A plurality of lights 74, 74*a* can be positioned between the camera 34 and the spherical objects O to illuminate the surfaces of the spherical objects O to facilitate line imaging thereof by the line sensor camera 34. The lights 74, 74*a* are positioned at an angle sufficient to prevent specular glare off the spherical objects O along the band on the surface of the spherical objects O that is imaged by the line sensor camera 34.

Figure 9A:
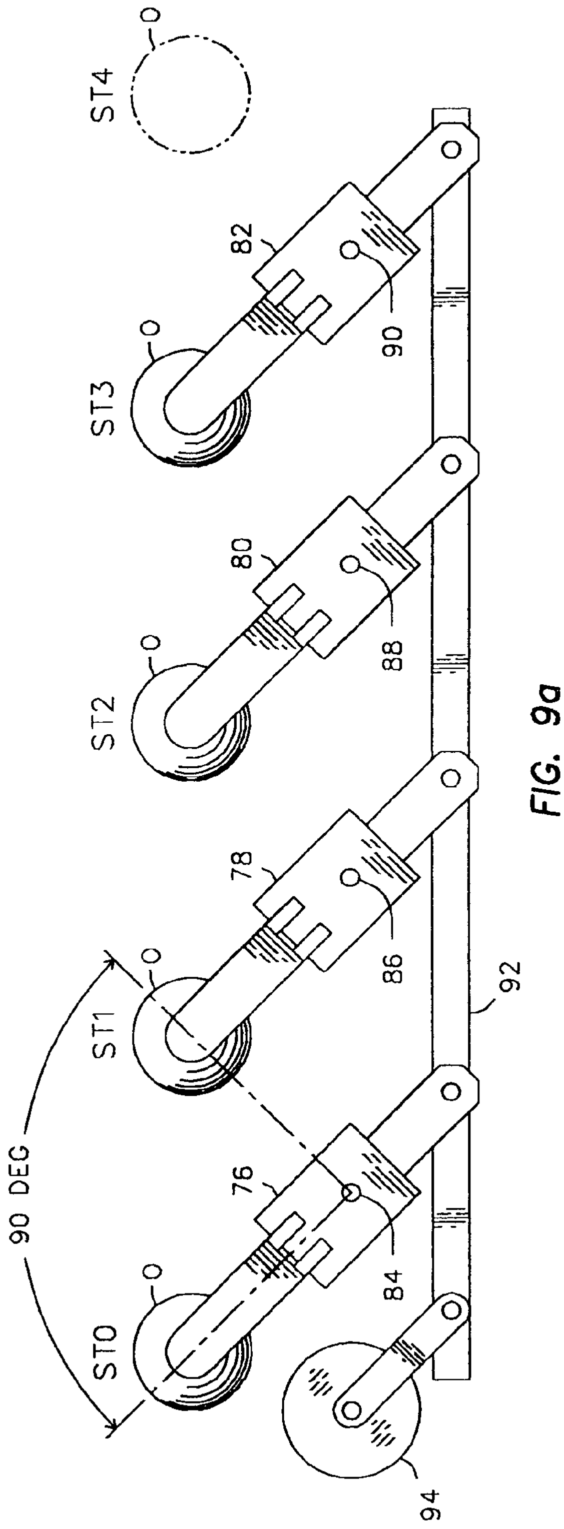
FIG. 9*a* is a front view of a preferred embodiment of the transposing apparatus utilized in the system according to the present invention.

FIG. 9*a* depicts in further detail the four transposing mechanisms 76, 78, 80, 82 described above that are operative for the purpose of transposing the spherical objects O from one work station to the immediately-adjacent processing work station while concomitantly causing the spherical objects O to be rotated through an angle of precisely 90 degrees. The transposing mechanisms 76, 78, 80, 82 are mounted to pivot points 84, 86, 88, 90, respectively, and all four transposing mechanisms 76, 78, 80, 82 are linked together by a beam 92 to a stepper motor 94 that pivots the transposing mechanisms 76, 78, 80, 82 about the pivot points 84, 86, 88, 90, respectively. The transposing mechanisms 76, 78, 80, 82 are disposed intermediate adjacent work stations (see FIG. 7 wherein the transposing mechanism 76 is disposed intermediate the pickup work station ST0 and the first processing work station ST1, the transposing mechanism 78 is disposed intermediate the first processing work station ST1 and the second processing work station ST2, the transposing mechanism 80 is disposed intermediate the second processing work station ST2 and the third processing work station ST3, and the transposing mechanism 82 is disposed intermediate the third processing work station ST3 and the fourth or final processing work station ST4) and pivot about the axes 84, 86, 88, 90, respectively, which are perpendicular to the plane containing the four axes of rotation of the spherical objects O. The axes 84, 86, 88, 90 are equidistant from adjacent work stations and positioned so that the spherical object O will come to rest in the lower cup of two adjacent workstations when the associated transposing mechanism is at each end of its 90 degree pivotal arc.

Figure 9B:
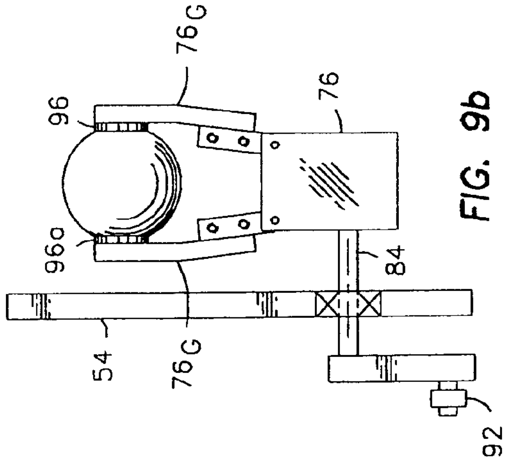
FIG. 9*b* is a side view of the transposing apparatus of FIG. 9*a*.

FIG. 9*b* depicts a side view of a single transposing mechanism 76 made up of a mechanical gripper $\mathbf{76}_G$ that is pneumatically operated and a pair of gripper pads 96, 96*a* made from low durometer polyurethane or rubber to prevent the spherical object O from moving relative to the gripper $\mathbf{76}_G$ when the spherical object O is conveyed through the fixed arc of 90 degrees. The centerline of the gripper $\mathbf{76}_G$ moves in the same plane as that of the rotational axes of the adjacent stations (see, e.g., axes Z2 and Z3 in FIG. 1).

Figure 10:
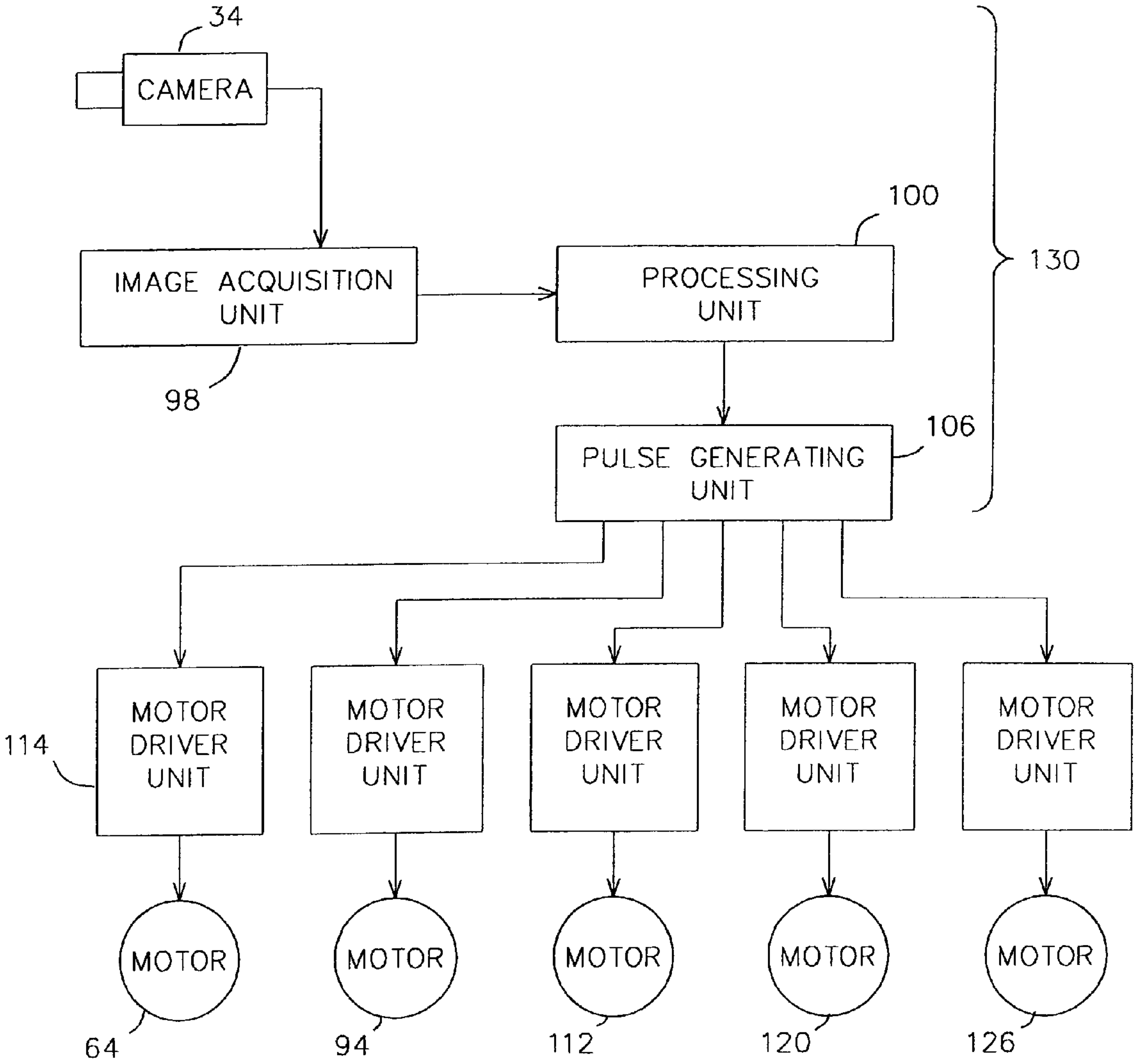
FIG. 10 is a block diagram of the calculating unit used for the present invention.

FIG. 10 is a block diagram showing the calculating unit 130 for the present invention. An image acquisition or “frame-grabbing” unit 98, which is operative for the purpose of acquiring the image from the line sensor camera 34, is connected to a processing unit 100. The processing unit 100 performs image processing and calculations to determine the Euler angles necessary to position the spherical object O at each processing work station ST2, ST3, ST4 as discussed above. The processing unit 100 is also connected to a pulse generating unit 106 that is operative to generates pulses that activate the stepper motor drivers 114 to rotate the stepper motors 64, 112, 120, 126, and concomitantly, the corresponding spherical objects O, through predetermined angles (for this described embodiment, the predetermined angles of rotation are controlled by the number of generated pulses).

Operation: The operation of the preferred embodiment described above will now be described. Initially, a randomly oriented spherical object O, with an existing reference indicium I, is supplied to the apparatus 53 at the pickup station ST0. The spherical object O is picked from the starting cup 60 at the first station ST0 by the first transposing mechanism 76. This transposing mechanism 76 grips the spherical object O and then pivots it through a fixed 90 degree arc resulting in the spherical object O being placed on the bottom cup 62 of the first processing, i.e., “locating”, work station ST1. The upper cup 66 is then operated to physically engage the spherical object O to hold it securely in the bottom cup 62. The transposing mechanism 76 releases the spherical object O and then rotates back to a vertical position midway between the two adjacent work stations ST0, ST1. The bottom cup 62 and spherical object O are then rotated about an axis (see axis Z1 in FIG. 2) that passes through the center of the spherical object O by the motor means 64. The line sensor camera means 34 (see FIG. 4 or 8—one skilled in the art will also appreciate that the dual line sensor configuration depicted in FIG. 2 could also be used) images the spherical object O while it is rotated at least one complete revolution at the first locating work station ST1. The processing unit 100 then manipulates the scanned line image 32 to determine the position and two-dimensional orientation of the reference indicium I on the spherical object O (see reference numeral 22 in FIG. 2).

In the preferred embodiment the existing manufacturer’s trade name indicium (see, e.g., FIGS. 1, 2) is used as a reference mark to define the target point on the surface of the spherical object where additional processing is to occur, i.e., printing of a custom insignia. Because there are usually two trade names or indicia on the spherical object, their relationship to any additional manufacturer’s indicia, for example the marking showing the ball type, is used to determine which trade name to use as the reference indicium. If the trade name is identified by the computer means then the spherical object O is rotated about its axis in order to place the centroid of said trade name on a circle defined by the intersection of the spherical object with the plane that includes the axis of rotation and is perpendicular to the X reference axis (see discussion above with respect to reference numeral 24 in FIG. 2 and the first locating work station ST1).

If the trade name is not detected then an attempt is made to extrapolate its position from the reference indicia that are visible. The extrapolated position of the trade name is then moved to a point on the circle. If the position of the trade name cannot be determined from the data in the image then the assumption is made that the trade name is located under either the bottom or upper cup 62, 66 and no move is made because the surface area obscured by these cups will end up on or near the equator when the spherical object O is conveyed to the second locating work station ST2.

The spherical object O is “released” at the first locating work station ST1 by retracting the upper cup 66 holding the spherical object O in the bottom cup 62, and then conveyed from the first locating work station ST1 to the second locating work station ST2 by means of the second transposing mechanism 78 located between the first locating work station ST1 and the second locating work station ST2, i.e., by pivoting the transposing mechanism 78 and the spherical object O together through a fixed arc of 90 degrees resulting in the spherical objected O being placed on the bottom cup 108 of the second locating work station ST2 of the apparatus 53 (see discussion above with respect to FIG. 7 and the first and second locating work stations ST1, ST2). The axis of rotation of the second locating work station ST2 now passes through the center of the spherical object O at an angle that is perpendicular to the line where the axis of rotation of the first locating work station ST1 passed through it. The upper cup 110 is then operated to physically engage the spherical object O to hold it securely in the bottom cup 108. The second transposing mechanism 78 releases the spherical object O and then rotates back to a vertical position midway between the first and second locating work stations ST1, ST2. The reference indicium I is now located near the equator of the spherical object O due to the coarse positioning done at the first locating work station ST1 (see discussion above with respect to reference numerals 22, 24 at the first locating work station ST1 in FIG. 2).

The bottom cup 108 is then rotated about an axis that passes through the center of the spherical object O by the motor means 112, which is operative to control the amount of rotation of the spherical object O, at the second locating work station ST2. The line sensor camera means 34 images the spherical object O while it is rotated at least one complete revolution. The entire reference indicium I is now visible in the ST2 image 33 without being truncated by the edge of the image (see FIG. 4; see also discussion above with respect to FIGS. 3, 4). The processing unit 100 is then operated to manipulate the ST2 image 33 to locate and define the position and two-dimensional orientation of the reference indicium I on the surface of the spherical object O. The center of the reference indicium I is calculated as well as the angle thereof from the X reference axis, i.e., the two-dimensional orientation of the reference indicium I. From this information the processing unit 100 calculates the three Euler angles .phi, .theta, .psi necessary to rotate the spherical object O for orientation thereof so that the reference indicium I is located at a predetermined final position (with a predetermined final two-dimensional orientation), i.e., so that the target point of the spherical object O is aligned or prepositioned for additional processing such as printing, inspection, or some other type of operation (see discussion above with respect to FIG. 2 and the second locating work station ST2—see also FIG. 4).

Once the reference indicium is located as described in the preceding paragraphs, and the Euler angles phi, theta, and psi have been determined, the second processing work station ST2 then functions as the first orienting work station ST2. The motor means 112 is then operative to rotate the spherical object O about the same axis used to image it (see axis Z2 in FIGS. 1, 2) to move the reference indicium I through the predetermined angle phi to the first reference position 12 (see discussion above with respect to FIG. 1 and the first orienting work station ST2). This results in movement of the reference indicium I from the defined position 11 to the first reference position 12, which is located on the circle C on the surface of the spherical object O defined by the plane that contains the axis of rotation Z2 and which is perpendicular to the X axis of the reference coordinate system (see FIG. 1).

The spherical object O is then transported from the first orienting work station ST2 to the second orienting work station ST3 by retracting the upper cup 110 to “release” the spherical object O at the first orienting work station ST2 and transposing it with the transposing mechanism 80 disposed between the first orienting work station ST2 and the second orienting work station ST3, i.e., by pivoting the transposing mechanism 80 and the spherical object O together through a fixed arc of 90 degrees resulting in the spherical object O being placed on the bottom cup 116 of the second orienting work station ST3 of the apparatus 53. In this position at the second orienting work station ST3, the reference indicium I of the spherical object O is now located at the second reference position 14 illustrated in FIG. 1. The axis of rotation Z3 of the second orienting work station ST3 now passes through the center of the spherical object O at an angle that is perpendicular to the line where the axis of rotation of station ST2 passed through it (see axis Z3 in FIG. 1). The upper cup 118 is then operated to physically engage the spherical object O to hold it securely in the bottom cup 116. The transposing mechanism 80 releases the spherical object O and then pivots back to a vertical position midway between the first and second orienting work stations ST2, ST3. The center of the reference indicium I at the second reference position 14 is now located on the equator (or circle C) of the spherical object O due to the positioning done at the first orienting work station ST2 (see FIG. 1). The bottom cup 116 is then rotated about an axis Z3 that passes through the center of the spherical object O by the motor means 120. The angle that the spherical object O is rotated through is the predetermined angle .theta. calculated from the image that was acquired when the spherical object O was at the second locating work station ST2. An additional rotation of 90 degrees is added to the predetermined angle .theta so that the reference indicium I ends up at the third reference position 16 that lies on the plane defined by the axes of rotation of the second and third orienting work stations ST3, ST4 (see reference numeral 16 in FIG. 1 and the discussion relating thereto).

The spherical object O is then transported to the third or final orienting work station ST4 by retracting the upper cup 118 to “release” the spherical object O at the second orienting work station ST3 and then transposing it with the transposing mechanism 82 disposed between the second and third orienting work station ST3, ST4, i.e., by pivoting the transposing mechanism 82 and the spherical object O together through a fixed arc of 90 degrees resulting in the spherical object O being placed on the bottom cup 122 of the third or final orienting work station ST4 of the apparatus 53. The axis of rotation of the final orienting work station ST4 now passes through the center of the spherical object O at an angle that is perpendicular to the line where the axis of rotation of the second orienting work station ST3 passed through it (see axis Z4 in FIG. 1). The upper cup 124 is then operated to physically engage the spherical object O to hold it securely in the bottom cup 122. The transposing mechanism 82 is operated to release the spherical object O and then rotates back to a vertical position midway between the second and third orienting work stations ST3, ST4. The reference indicium I is now located at the fourth or final reference position 18, i.e., the top pole, of the spherical object O (see reference numeral 18 in FIG. 1 and discussion above relating thereto). The bottom cup 122 is then rotated about an axis that passes through the center of the spherical object by the motor means 126 (see axis Z4 in FIG. 1). The predetermined angle that the spherical object O is rotated through at the third orienting work station ST4 is the predetermined angle .psi calculated from the image that was acquired when the spherical object O was at the second locating work station ST2.

The spherical object O at the third orienting work station ST4 is now disposed so that the reference indicium I is in the final reference position with the final two-dimensional orientation (see reference numeral 20 in FIG. 1 and discussion above relating thereto) that results in the target point TP being in the aligned or prepositioned for additional processing (see FIG. 1). The spherical object O can now be moved by a similar transposing mechanism or other means onto a conveyor, or the like, that maintains the reference indicium in the predetermined final position and two-dimensional orientation while performing additional process on the spherical object O through a printer, or performing some other operation on the properly oriented spherical object, e.g. inspection.

Another embodiment of the spherical object orienting system according to the present invention would be to use the dimple pattern of a spherical object such as a golf ball as the reference indicium for spatially orientating the spherical object utilizing the apparatus and method of the present invention described above.

Another embodiment of the spherical object orienting system according to the present invention would be to use a time-delay integration line sensor camera to image the surface of the spherical object. This would allow the spherical object to be rotated faster with the same amount of light, or rotated at the same speed with less light, as the plurality of data lines representing the image of the spherical object is acquired.

Another embodiment of the spherical object orienting system according to the present invention would be to use a camera means at the final orienting work station ST4 to verify that the spherical object was successfully spatially orientated.

A variety of modifications and variations of the present invention are possible in light of the above teachings. It is therefore to be understood that, within the scope of the appended claims, the present invention may be practiced other than as specifically described above.

What is claimed is:

1. A system for automatically orienting a spherical object using a reference indicium on the spherical object, comprising:

(A) means for automatically locating and defining a position and two-dimensional orientation of the reference indicium; and (B) means for automatically orienting the spherical object by sequentially rotating the spherical object from the defined position and two-dimensional orientation determined by the automatic locating means through determined angles so that the reference indicium of the spherical object has a predetermined final position and two-dimensional orientation wherein a target point on the spherical object, which has a predetermined spatial relationship to the reference indicium, is positioned for further processing, wherein the automatic locating and defining means comprises:

(1) first and second locating work stations, each of the first and second locating work stations having a axis of rotation and being operative to rotate the spherical object around the axis of rotation;

(2) transposing means for conveying the spherical object between the first and second locating work stations in such manner that the spherical object is rotated through a single-degree of freedom by 90 degrees between the first and second locating work stations and between the second locating work station and the orienting means, respectively;

(3) an imaging system operative to generate an image of the spherical object at each of the first and second locating work stations as the spherical object is rotated about the axis of rotation of the first and second locating work stations through at least one revolution, respectively; and (4) calculating means for processing the image of the spherical object generated at the first and second locating work stations, respectively, to locate and identify the defined position and two-dimensional orientation of the reference indicium and to determine angles for rotation for the spherical object by the orienting means;

wherein the calculating means is operative to process the image of the spherical object generated at the first locating work station to identify a coarse position and two dimension orientation of the reference indicium at the first locating work station and to determine an angle of rotation for the spherical object at the first locating station;

the first locating work station means is operative to rotate the spherical object about the determined angle to move the spherical object to a second position at the first locating work station; and the transposing means is the operative to convey the spherical object to the second locating work station wherein the spherical object is rotated through the single-degree of freedom by 90 degrees such that the reference indicium is at the defined position and two dimensional orientation on the equator of the spherical object at the second locating work station;

wherein the automatic orienting means comprises:

(1) first, second, and third orienting work stations, each having an axis of rotation and being operative to sequentially rotate the spherical object through one of the determined angles so that the reference indicium is transposed from the defined position and two-dimensional orientation at the first orienting work station to the predetermined final position and two-dimensional orientation at the third orientating work station wherein the target point on the spherical object is positioned for further processing; and (2) transposing means for conveying the spherical object between the first and second and second and third orienting work stations in such manner that the spherical object is rotated through the single-degree of freedom by 90 degrees between the first and second orienting work stations and between the second and third orienting work stations, respectively;

wherein the transposing means comprises:

(1) a first transposing mechanism pivotally mounted intermediate the first and second orienting work stations and operative to convey the spherical object from the first orienting work station to the second orienting work station in such manner that the spherical object is rotated through the single-degree of freedom by 90 degrees; and (2) a second transposing mechanism pivotally mounted intermediate the second and third orienting work stations and operative to convey the spherical object from the second orienting work station to the third orienting work station in such manner that the spherical object is rotated through the single-degree of freedom by 90 degrees; and wherein the 90 degrees single-degree of freedom rotation provided by the transposing means between the first and second and the second and third orienting work stations are coplanar with the axes of rotation of the first, second, and third orienting work stations;

the second locating work station is equal to and functions as the first orienting work station; and the determined angles of rotation implemented by the first, second, and third orienting work stations, respectively, comprise Euler angles of rotation .phi, .theta plus an additional 90 degrees, and .psi, respectively.

2. The system of claim 1 wherein the 90 degrees single-degree of freedom rotation provided by the transposing means between the first and second locating work stations and the second locating work station and the orienting means is coplanar with the axes of rotation of the first and second locating work stations.

3. The system of claim 1 wherein the imaging system comprises:

a first imaging means having an image axis perpendicular to the spherical object at the first locating work station;

a second imaging means having an image axis perpendicular to the spherical object at the second locating work station; and wherein the first and second imaging means are operative to generate the image of the spherical object at the first and second locating work stations, respectively.

4. The system of claim 1 wherein the imaging system comprises:

a single line sensor camera having an imaging axis;

a first set of mirrors aligned to capture the image of the spherical object at the first locating work station for the single line sensor camera; and a second set of mirrors aligned to capture the image of the spherical object at the second locating work station for the single line sensor camera;

where the single line sensor camera is operative, using the first and second set of aligned mirrors, to generate the image of the spherical object at the first and second locating work stations, respectively, and wherein the first and second set of aligned mirrors position the axis of rotation of the first spherical object and the axis of rotation of the second spherical object on the imaging axis of the line sensor camera.

5. A system for automatically orienting a spherical object using a reference indicium on the spherical object, comprising:

first and second locating work stations each having an axis of rotation and operative to rotate the spherical object about the axis of rotation;

first, second, and third orienting work stations each having an axis of rotation and operative to rotate the spherical object about the axis of rotation through a determined angle of rotation so that the reference indicium at the third orienting work station has a predetermined final position and two-dimensional orientation wherein a target point on the spherical object, which has a predetermined spatial relationship to the reference indicium, is positioned for further processing;

transposing means for conveying the spherical object between the locating work stations and between the orienting work stations in such manner that the spherical object is rotated through a single-degree of freedom by 90 degrees each time the spherical object is conveyed between adjacent work stations, respectively;

an imaging system operative to generate an image of the spherical object at each of the first and second locating work stations as the spherical object is rotated about the axis of rotation of the first and second locating work stations, respectively; and calculating means for processing the images of the spherical object generated at the first and second locating work stations to locate and identify a defined position and two-dimensional orientation of the reference indicium at the second locating work station and to determine the angles of rotation for the spherical object at the first, second, and third orienting work stations wherein the reference indicium is rotated from the defined position and two-dimensional orientation at the first orienting work station to the predetermined final position and two-dimensional orientation at the third orienting work station so that the target point is positioned for further processing; wherein:

the second locating work station is equal to and functions as the first orienting work station;

the first orienting work station is operative to rotate the spherical object through one of the determined angles of rotation such that the reference indicium of the spherical object is moved from the defined position and two-dimensional orientation at the first orienting work station to a first reference position and two-dimensional orientation at the first orienting work station; and wherein the transposing means is then operative to convey the spherical object from the first orienting work station to the second orienting work station so that the reference indicium is moved to a second reference position at the second orienting work station; and wherein the second orienting work station is operative to rotate the spherical object through another of the determined angles of rotation such that the reference indicium of the spherical object is moved from the second reference position and two-dimensional orientation at the second orienting work station to a third reference position and two-dimensional orientation at the second orienting work station; and wherein the transposing means is then operative to convey the spherical object from the second orienting work station to the third orienting work station so that the reference indicium is moved to a fourth reference position at the third orienting work station; and wherein the third orienting work station is operative to rotate the spherical object through yet another of the determined angles of rotation such that the reference indicium of the spherical object is moved from the fourth reference position and two-dimensional orientation at the third orienting work station to the predetermined final reference position and two-dimensional orientation at the third orienting work station such that the target point on the spherical object is positioned for further processing; and wherein the one, another, and yet another determined angle of rotation implemented by the first, second, and third orienting work stations, respectively, comprise Euler angles of rotation .phi, .theta plus an additional 90 degrees, and .psi, respectively.

6. The system of claim 5 wherein the imaging system comprises:

a first imaging means having an image axis perpendicular to the spherical object at the first locating work station;

a second imaging means having an image axis perpendicular to the spherical object at the second locating work station; and wherein the first and second imaging means are operative to generate the image of the spherical object at the first and second locating work stations, respectively.

7. The system of claim 5 wherein the imaging system comprises:

a single line sensor camera having an imaging axis;

a first set of mirrors aligned to capture the image of the spherical object at the first locating work station for the single line sensor camera;

a second set of mirrors aligned to capture the image of the spherical object at the second locating work station for the single line sensor camera;

wherein the single line sensor camera is operative, using the first and second set of aligned mirrors, to generate the image of the spherical object at the first and second locating work stations, respectively, and wherein the first and second set of aligned mirrors position the axis of rotation of the first spherical object and the axis of rotation of the second spherical object on the imaging axis of the line sensor camera.

8. The system of claim 5 wherein the 90 degrees single-degree of freedom rotation provided by the transposing means between the locating work stations and the first, second, and third orienting work stations is coplanar with the axes of rotation of the first and second locating work stations and the first, second, and third orienting work stations.

9. The system of claim 5 wherein the transposing means comprises:

a first transposing mechanism pivotally mounted intermediate the first and second locating work stations and operative to convey the spherical object from the first locating work station to the second locating work station in such manner that the spherical object is rotated through the single-degree of freedom by 90 degrees; and a second transposing mechanism pivotally mounted intermediate the first and second orienting work stations and operative to convey the spherical object from the first orienting work station to the second orienting work station in such manner that the spherical object is rotated through the single-degree of freedom by 90 degrees; and a third transposing mechanism pivotally mounted intermediate the second and third orienting work stations and operative to convey the spherical object from the second orienting work station to the third orienting work station in such manner that the spherical object is rotated through the single-degree of freedom by 90 degrees.

10. The system of claim 9 wherein the 90 degrees single-degree of freedom rotation provided by the transposing means between the first and second locating work stations, the first and second orienting work stations, and the second and third orienting work stations is coplanar with the axes of rotation of the locating work stations and the orienting work stations.

11. The system of claim 5 wherein the calculating means is operative to process the image of the spherical object generated at the first locating work station to identify a coarse position and two-dimensional orientation of the reference indicium at the first locating work station and to determine an angle of rotation for the spherical object at the first locating work station; and wherein the first locating work station is operative to rotate the spherical object through the determined angle wherein the reference indicium is moved from the defined coarse position and two-dimensional orientation to a second defined position and two-dimensional orientation at the first locating work station; and wherein the transposing means is operative to convey the spherical object from the first locating work station to the second locating work station wherein the spherical object is rotated through a single-degree of freedom by 90 degrees such that the reference indicium of the spherical object is located at the defined position and two-dimensional orientation at the second locating work station.

12. A method of automatically orienting a spherical object using a reference indicium on the spherical object so that a target point, which has a predetermined spatial relationship with the reference indicium, is positioned for further processing, comprising:

locating and defining a position and two-dimensional orientation of the reference indicium on the spherical object;

calculating, based on the defined position and two-dimensional orientation of the reference indicium, angles of rotation for the spherical object to move the reference indicium from the defined position and two-dimensional orientation to the predetermined final position and two-dimensional orientation;

rotating the spherical object at a first orienting work station through one of the calculated angles of rotation to move the reference indicium from the predefined position and two-dimensional orientation to a first reference position and orientation at the first orienting work station;

conveying the spherical object from the first orienting work station to a second orienting work station in a manner such that the spherical object is rotated through a single-degree of freedom by 90 degrees wherein the reference indicium is at a second reference position and two-dimensional orientation at the second orienting work station;

rotating the spherical object at the second orienting work station through anther of the calculated angles of rotation to move the reference indicium from the second reference position and two-dimensional orientation to a third reference position and two-dimensional orientation at the second orienting work station;

conveying the spherical object from the second orienting work station to a third orienting work station in a manner such that the spherical object is rotated through a single degree of freedom by 90 degrees wherein the reference indicium is at a fourth reference position and two-dimensional orientation at the third orienting work station; and rotating the spherical object at the third orienting work station through yet another of the calculated angles of rotation to move the reference indicium from the fourth reference position and two-dimensional orientation to the predetermined final position and two-dimensional orientation at the third orienting work station wherein the target point is positioned for further processing;

wherein the one, another, and yet another calculated angles of rotation, respectively, comprise Euler angles of rotation .phi, .theta plus an additional 90 degrees, and .psi, respectively.

13. The method of claim 12 wherein the step of locating the defined position and two-dimensional orientation of the reference indicium on the spherical object comprises:

providing the spherical object having a random position and two-dimensional orientation of the reference indicium at a first locating work station;

imaging the spherical object at the first locating work station;

determining a coarse position and two-dimensional orientation of the reference indicium using the generated image;

calculating an angle of rotation for the spherical object at the first locating work station using the generated image;

rotating the spherical object through the calculated angle of rotation to move the reference indicium from the coarse position and two-dimensional orientation to a second position and two-dimensional orientation at the first locating work station;

conveying the spherical object from the first locating work station to a second locating work station in a manner such that the spherical object is rotated through a single-degree of freedom by 90 degrees wherein the reference indicium is at the defined position and orientation at the second locating work station;

imaging the spherical object at the second locating work station; and locating and defining the defined position and two-dimensional orientation of the reference indicium of the spherical object at the second locating work station using the generated image.

14. A system for imaging the surface of a spherical object, comprising:

a first work station having an axis of rotation and operative to rotate the spherical object about the axis of rotation, and wherein a plane of the spherical object perpendicular to the axis of rotation is defined as the rotational plane of the spherical object at the first work station;

a second work station having an axis of rotation and operative to rotate the spherical object about the axis of rotation, and wherein a plane of the spherical object perpendicular to the axis of rotation is defined as the rotational plane of the spherical object at the second work station;

transposing means for conveying the spherical object from the first work station to the second work station in such manner that the spherical object is rotated through a single degree of freedom by 90 degrees wherein the rotational plane of the spherical object at the first work station is rotated through an angle of 90 degrees such that the rotational plane defined by the spherical object at the first work station is perpendicular to the rotational plane of the spherical object at the second work station; and an imaging system positioned and operative to generate an image of the surface of the spherical object at each of the first and second work stations; and wherein the imaging system is operative to generate a first image of the surface of the spherical object as the spherical object is rotated through at least one complete revolution about the axis of rotation of the first work station; and wherein the imaging system is operative to generate a second image of the surface of the spherical object as the spherical object is rotated through at least one complete revolution about the axis of rotation of the second work station; and the first and second work stations are substantially identical in structure.

15. The system of claim 14 wherein the imaging system comprises:

a first imaging means having an image axis perpendicular to the spherical object at the first work station and operative to generate the first image of the surface of the spherical object; and a second imaging means having an image axis perpendicular to the spherical object at the second work station and operative to generate the second image of the surface of the spherical object.

* * * * *